United States Patent
Jayaprakash (10) Patent No.: US 10,725,921 B2
(45) Date of Patent: *Jul. 28, 2020

(54) SYSTEM AND METHOD FOR CACHING TIME SERIES DATA

(71) Applicant: InMobi PTE Ltd., Singapore (SG)

(72) Inventor: Arvind Jayaprakash, Bangalore (IN)

(73) Assignee: InMobi PTE Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,621

(22) Filed: Jan. 28, 2019

(65) Prior Publication Data

US 2019/0155734 A1    May 23, 2019

Related U.S. Application Data

(63) Continuation of application No. 15/913,744, filed on Mar. 6, 2018, now Pat. No. 10,191,848, which is a continuation of application No. 14/628,463, filed on Feb. 23, 2015, now abandoned.

(51) Int. Cl.
*G06F 12/0862* (2016.01)
*G06F 12/0866* (2016.01)

(52) U.S. Cl.
CPC ...... *G06F 12/0862* (2013.01); *G06F 12/0866* (2013.01); *G06F 2212/465* (2013.01);
(Continued)

(58) Field of Classification Search
CPC .......... G06F 3/06; G06F 8/4442; G06F 12/08; G06F 12/0802; G06F 12/0862; G06F 12/0866; G06F 17/30; G06F 2212/21; G06F 2212/211; G06F 2212/2112; G06F 2212/213; G06F 2212/214;
(Continued)

(56) References Cited

U.S. PATENT DOCUMENTS 6,266,605 B1 * 7/2001 Yasui ................. F02D 41/1403
  60/276
6,654,855 B1 * 11/2003 Bopardikar ........... G06F 12/121
  711/118

(Continued)

OTHER PUBLICATIONS

Towards a scalable management collector; Douitsis et al; Global Information Infrastructure and Networking Symposium; Oct. 19-21, 2016 (6 pages) (Year: 2016).*

(Continued)

*Primary Examiner* — Daniel C. Chappell (57) ABSTRACT

The present invention provides a method and system for caching time series data. A computer system for caching time series data is disclosed. The computer system comprises one or more processors, at least one cache, and a computer readable storage medium. The computer readable storage medium contains instructions that, when executed by the one or more processors, causes the one or more processors to perform a set of steps comprising fetching the time series data from a time series data source, calculating one or more expiry timestamps, grouping the plurality of time series datum in to one or more time data chunks based on the one or more expiry timestamps, and storing a copy of the time series data and the one or more expiry timestamps in the at least one cache.

20 Claims, 5 Drawing Sheets

(52) U.S. Cl.
CPC .. *G06F 2212/466* (2013.01); *G06F 2212/602* (2013.01); *G06F 2212/6024* (2013.01)

(58) Field of Classification Search
CPC ..... G06F 2212/2142; G06F 2211/2146; G06F 2212/22; G06F 2212/221; G06F 2212/222; G06F 2212/2228; G06F 2212/224; G06F 2212/225; G06F 2212/26; G06F 2212/261; G06F 2212/262; G06F 2212/263; G06F 2212/2664; G06F 2212/28; G06F 2212/31; G06F 2212/46; G06F 2212/461; G06F 2212/462; G06F 2212/463; G06F 2212/464; G06F 2212/465; G06F 2212/466; G06F 2212/468; G06F 2212/60; G06F 2212/602; G06F 2212/6022; G06F 2212/6024; G06F 2212/6026; H04L 67/2842
See application file for complete search history.

(56) References Cited

U.S. PATENT DOCUMENTS

| | | | | |
|---|---|---|---|---|
| 9,053,038 | B2* | 6/2015 | Traut | G06F 12/0866 |
| 9,152,672 | B2* | 10/2015 | Lin | G06F 16/2455 |
| 9,201,800 | B2* | 12/2015 | Bolla | G06F 12/0866 |
| 2007/0028070 | A1* | 2/2007 | Avergun | G06F 12/123 711/172 |
| 2008/0126408 | A1* | 5/2008 | Middleton | G06F 16/2477 |
| 2011/0153603 | A1* | 6/2011 | Adiba | G06F 16/2477 707/737 |
| 2011/0167486 | A1* | 7/2011 | Ayloo | G06Q 10/00 726/7 |
| 2014/0172867 | A1* | 6/2014 | Lin | G06F 16/2455 707/741 |
| 2014/0358968 | A1* | 12/2014 | Bowman | G06F 16/2477 707/771 |

OTHER PUBLICATIONS

Fast approximate correlation for massive time-series data; Mueen et al; Proceedings of the 2010 ACM SIGMOD International Conference on Management of data; Jun. 6-10, 2010; pp. 171-182 (12 pages) (Year: 2010).*

Reducing data transfer for charts on adaptive web sites; Burtini et al; Proceedings of the 28th Annual ACM Symposium on Applied Computing; Mar. 18-22, 2013; pp. 865-867 (3 pages) (Year: 2013).*

* cited by examiner

SYSTEM AND METHOD FOR CACHING TIME SERIES DATA

FIELD OF INVENTION

The present invention relates to time series data, and in particular, it relates to caching of time series data.

BACKGROUND

Time series data refers to sequences of data points measured over a span of time, often spaced at uniform time intervals. Time series data is often stored on a remote server known as historian. The historian is responsible for collecting raw time series data and cleaning raw time series data. For analysis and query purposes, time series data is fetched from the historian. However, due to the ever increasing size of time series data, retrieval of time series data is an expensive operation in terms of network resources.

There have been several approaches to optimize the retrieval of time series data. One such approach (US 20110153603, Adiba et al.; US 20110167486, Ayloo et al.) suggests the usage of a cache memory for holding recent time series data. However, this approach is often inefficient as the cached time series data is not reflective of the actual time series data. Time series data is mutable since corrections are often made to the time series data at a later point of time. When a correction is made to the actual time series data, the cached data is no longer valid. Since the current approach does not take into account the mutable nature of time series data, the current approach is inefficient.

Therefore, in light of the above discussion, there is a need for a method and system which overcomes all the above stated problems.

BRIEF DESCRIPTION OF THE INVENTION

The above-mentioned shortcomings, disadvantages and problems are addressed herein which will be understood by reading and understanding the following specification.

In embodiments, the present invention provides a computer system for caching time series data. The computer system includes one or more processors, at least one cache, and a computer readable storage medium. The computer readable storage medium contains instructions that, when executed by the one or more processors, causes the one or more processors to perform a set of steps comprising: fetching the time series data from a time series data source, calculating one or more expiry timestamps, grouping the plurality of time series datum in to one or more time data chunks based on the one or more expiry timestamps and storing a copy of the time series data and the one or more expiry timestamps in the at least one cache The time series data includes a plurality of time series datum and a fetch timestamp. Each expiry timestamp from the one or more expiry timestamps is calculated using a composite function of the fetch timestamp of the time series data and a recording time associated with a time series datum, such that the expiry timestamp is inversely proportional to the recording time associated with the time series datum and directly proportional to the fetch timestamp of the time series data. Each time data chunk from the one or more time data chunks includes a distinct set of time series datum from the time series data.

In an embodiment, the one or more processors are configured to receive a request for the time series data, decompose the request into one or more sub requests based on the one or more time data chunks of the time series data, determine the validity of the one or more time data chunks of the time series data based on the one or more expiry timestamps; and serve the one or more sub requests from one of a group consisting of the time series data source and the at least one cache, based on the validity of the one or more time data chunks of the time series data.

In an embodiment, the one or more processors are configured to determine the validity of the one or more time data chunks by comparing an associated expiry timestamp with a request timestamp associated with the request. In an embodiment, the composite function is monotonically non-increasing function with a predetermined upper limit. In an embodiment, the at least one cache is a browser cache.

In another aspect, the present invention provides a computer implemented method for caching time series data. The computer implemented method comprises fetching, by one or more processors, the time series data from a time series data source, calculating, by one or more processors, one or more expiry timestamps, grouping, by one or more processors, the plurality of time series datum in to one or more time data chunks based on the one or more expiry timestamps, and storing, by one or more processors, a copy of the time series data and the one or more expiry timestamps in at least one cache.

Systems and methods of varying scope are described herein. In addition to the aspects and advantages described in this summary, further aspects and advantages will become apparent by reference to the drawings and with reference to the detailed description that follows.

DETAILED DESCRIPTION OF THE INVENTION

In the following detailed description, reference is made to the accompanying drawings that form a part hereof and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
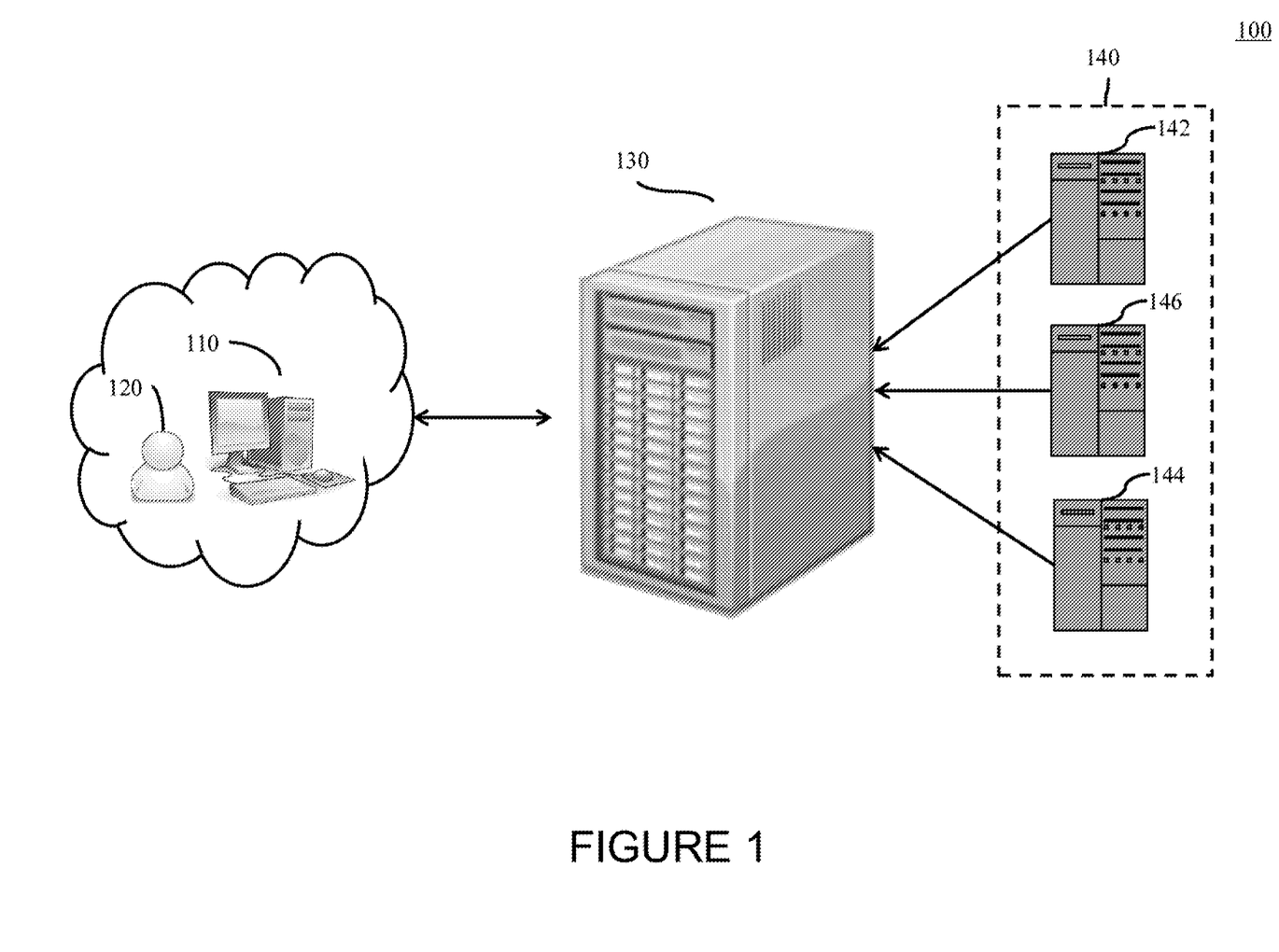
FIG. 1 illustrates a system for caching time series data, in accordance with various embodiments of the present invention.

FIG. 1 illustrates a system 100 for caching time series data, in accordance with various embodiments of the present invention.

The computing system 100 includes a user terminal 110. In context of the present invention, the user terminal 110 refers to a workstation or a terminal used by a user 120. The user terminal 110 includes one or more processors, a computer readable storage medium and at least one cache. The user terminal 110 allows the user 120 to retrieve the time series data from a historian server 130, which is a time series data source. In an embodiment, the user terminal 110 includes a browser with a browser cache. The user 120 uses the browser to view the time series data. The browser stores the time series data in the browser cache for faster access. In another embodiment, the user terminal 110 stores time series in the at least one cache for faster access. In an embodiment, the user terminal 110 allows the user 120 to execute queries on the time series data present on the historian server 130.

The historian server 130 stores the time series data. The historian server 130 includes one or more processors, a computer readable storage medium and at least one server side cache. In an embodiment, the historian server 130 receives the time series data from a cluster of application servers 140, which includes a plurality of time series data sources. In an example as shown in FIG. 1, the cluster of application servers 140 includes application server 142, application server 144, and application server 146. Each application server from the cluster of application servers 140 generates a log file which contains the time series data. The log files are sent to the historian server 130 by the cluster of application servers 140. In an embodiment, the cluster of application servers 140 are advertisements tracking servers that maintain logs about countable metrics, such as clicks & impressions, etc. In an embodiment, the historian server 130 assimilates the log files, cleans the data in the log files by removing inconsistent and incomplete records and stores resultant time series data. In an embodiment, the historian server 130 stores recently accessed time series data in the least one server side cache for faster service.

It will be appreciated by the person skilled in the art, that while FIG. 1, shows the historian server 130 as a single computing device, the historian server 130 can include multiple computing devices connected together. Similarly, it will be appreciated by the person skilled in the art, that while FIG. 1 shows a single user terminal 110, there can a plurality of computing devices connected to the historian 130. The plurality of computing devices includes a chain of computing devices connected sequentially. The present invention is compatible with the chain of computing devices.

Moreover, it will be appreciated by the persons skilled in the art that while FIG. 1 shows four application servers 142, 144 and 146, there can be one or more application servers in the cluster of application servers 140. Further, the application servers can be used for a plurality of purposes such as factory metrics recording, product quality control and automation, weather monitoring, etc.

Figure 2:
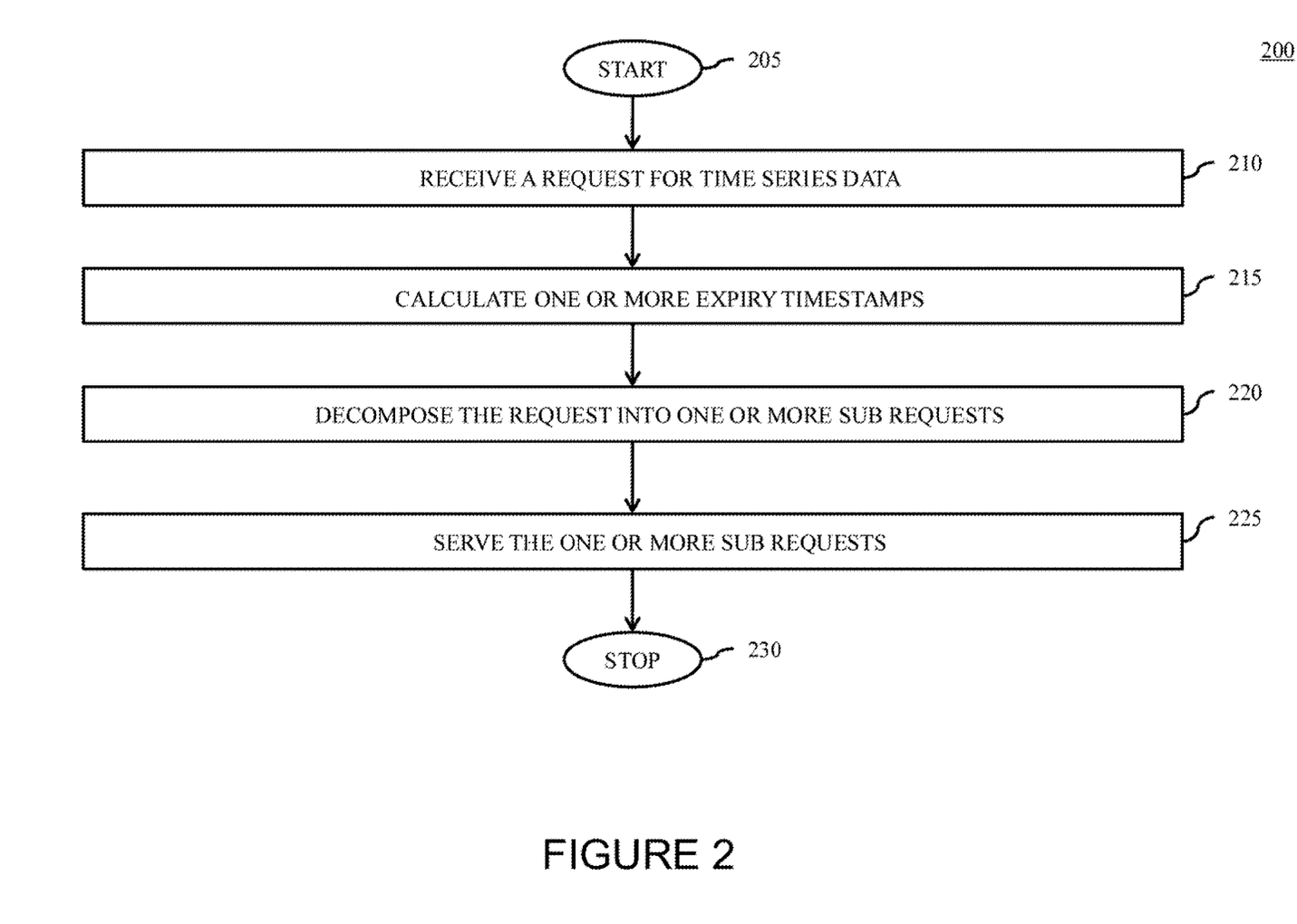
FIG. 2 illustrates a flowchart for serving time series data, in accordance with various embodiments of the present invention.

FIG. 2 illustrates a flowchart 200 for serving a request for time series data, in accordance with various embodiments of the present invention. The flowchart 200 is implemented using the user terminal 110. At step 205, the flowchart 200 initiates. At step 210, the user terminal 110 receives a request for time series data. In an example, at 7 pm the user 120 requests for time series data between 2 pm and 6 pm. The requested time series data has 6 time series datum, since the granularity of sampling is 1 hour in the current example At step 215, the user terminal 110 calculates one or more expiry timestamps. Continuing the above mentioned example, the user terminal 110 calculates each expiry timestamp from the one or more expiry timestamps using a composite function of a recording time of a time series datum and the current time 7 pm. Each expiry timestamp calculated using the composite function is inversely proportional to the recording time associated with the time series datum (indicated using the notation $T_{record}$) and directly proportional to the current time (indicated using the notation $T_{current}$). A mathematical representation of the above statement is given below:

if $T_{current} > T_{current+X}$, then $T_{expiry\ N} > T_{expiry\ N+X}$  1)

if $T_{record\ N} < T_{record\ N+Y}$, then $T_{expiry\ N} >= T_{expiry\ N+Y}$  2)

In an embodiment, the composite function is a monotonically non increasing function between recording timestamp and expiry timestamp, i.e., as the recording time increases the value of the expiry timestamp decreases.

Continuing the example mentioned above, initially 6 expiry timestamps are calculated using the composite function; each expiry timestamp for each time series datum present in the time series data. An illustration of a possible composite function with an upper limit of 24 hour is defined below:

expiry timestamp $T_{expiry} = F_{composite}(T_{record}, T_{current})$
$F_{composite}(T_{record}, T_{current}) = \{$
if $(T_{current} - T_{record}) < 30$ minutes, then $T_{expiry}$ should be $T_{current} + 2$ minutes;
else if 30 minutes $<= (T_{current} - T_{record}) < 5$ hours, then $T_{expiry}$ should be $T_{current} + 15$ minutes;
else if 5 hours $<= (T_{current} - T_{record}) < 24$ hours, then $T_{expiry}$ should be $T_{current} + 1$ hour;
else, $T_{expiry}$ should be $T_{current} + 24$ hours;
$\}$ Using the abovementioned composite function, the following expiry timestamps are calculated:
Time series datum 1 8 pm
Time series datum 2 7:15 pm
Time series datum 3 7:15 pm
Time series datum 4 7:15 pm
Time series datum 5 7:15 pm
Time series datum 6 7:15 pm
While the expiry timestamp is calculated for each time series datum in the time series data, there are only two distinct expiry timestamps: 8 pm and 7:15 pm. These two timestamps are final result of step 215.

At step 220, the user terminal 110 decomposes the request into one or more sub requests based on the one or more expiry timestamps. Continuing the abovementioned example, the request is broken in two sub requests, the first sub request for the time series datum having expiry timestamp 8:00 pm and the second sub request for the time series data having expiry timestamp 7:15 pm.

At step 225, the user terminal serves the one or more sub request from at least one of the historian 130 and a cache memory. The user terminal 110 will query the cache memory to determine if a copy of time series data exists in the cache, if the copy of time series data exists in the cache the user terminal 110 serves a sub-request from the cache. If the cache does not contain the copy of the time series data, the user terminal 110 retrieves the time series data from the historian server 130. At step 230, the flowchart 200 terminates.

Figure 3:
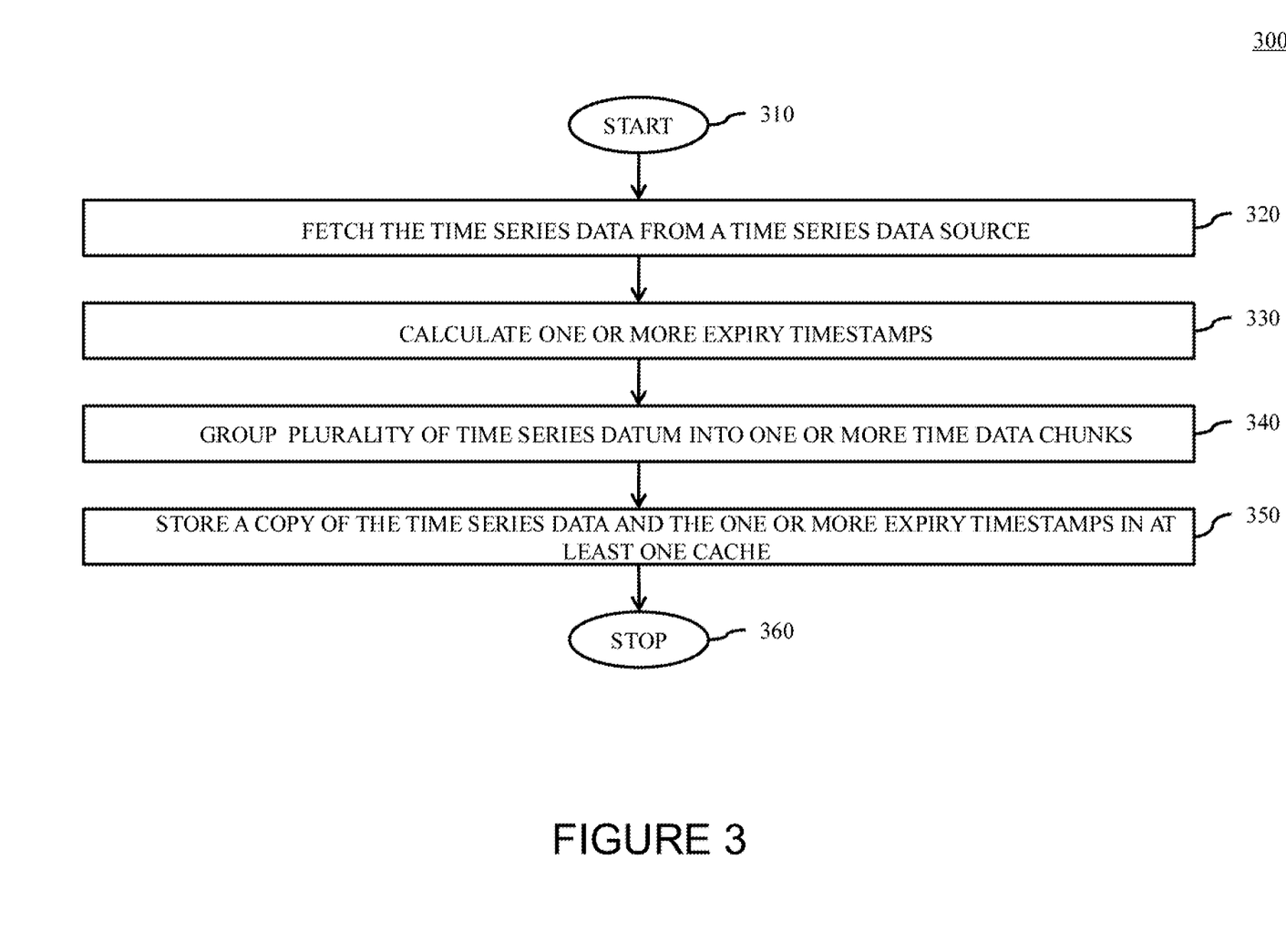
FIG. 3 illustrates a flowchart for caching time series data, in accordance with various embodiments of the present invention.

FIG. 3 illustrates a flowchart 300 for caching the time series data, in accordance with various embodiments of the present invention. The flowchart 300 is implemented using the historian server 130.

At step 310, the flowchart 300 initiates. At step 320, the historian server 130 fetches the time series data from the application servers 140. In an embodiment, the historian server 130 fetches the time series data in response to a determination that a valid copy of the time series data does not exist locally. In an embodiment, the historian server 130 fetches the time series data in response to a user query. In another embodiment, the historian server 130 automatically fetches the time series data in response to a pre-fetching policy. The time series data includes a plurality of time series datum and a fetch timestamp. The fetch timestamp indicates the time at which the time series data was fetched by the historian server 130. In an embodiment, the historian server 130 records the fetch timestamp on receiving a request.

For example, the time series data includes ten time series datum: {45, 65, 78, 90, 112, 120, 123, 145, 170, 210} and a fetch timestamp: 9 pm. The time series data has a sampling period of half an hour. The first time series datum 45 is recorded at 2 pm, the second time series datum 65 is recorded at 2:30 pm, and the rest of the time series data similarly recorded with a periodic interval of half an hour. The fetch timestamp 9 pm indicates that the time series data was fetched at 9 pm.

At step 330, the historian server 130 calculates one or more expiry timestamps. Each expiry timestamp from the one or more expiry timestamps is calculated using a composite function of a recording time of a time series datum and the fetch timestamp. Each expiry timestamp calculated using the composite function is inversely proportional to the recording time associated with the time series datum and directly proportional to the fetch timestamp of the time series data. A mathematical representation of the above statement is given below:

$$\text{if } T_{fetch\ N} > T_{fetch\ N+X}, \text{ then } T_{expiry\ N} > T_{expiry\ N+X} \quad 1)$$

$$\text{if } T_{record\ N} < T_{record\ N+Y}, \text{ then } T_{expiry\ N} >= T_{expiry\ N+Y} \quad 2)$$

In an embodiment, the composite function is a monotonically non increasing function between recording timestamp and expiry timestamp, i.e., as the recording time increases the value of the expiry timestamp decreases.

Continuing the example mentioned above, initially 10 expiry timestamps are calculated using the composite function; each expiry timestamp for each time series datum present in the time series data. An illustration of a possible composite function with an upper limit of 24 hour is defined below:

expiry timestamp $T_{expiry} = F_{composite}(T_{record}, T_{fetch})$
$F_{composite}(T_{record}, T_{fetch}) = \{$
  if $(T_{fetch} - T_{record}) < 30$ minutes, then $T_{expiry}$ should be $T_{fetch} + 2$ minutes;
  else if 30 minutes $<= (T_{fetch} - T_{record}) < 5$ hours, then $T_{expiry}$ should be $T_{fetch} + 15$ minutes;
  else if 5 hours $<= (T_{fetch} - T_{record}) < 24$ hours, then $T_{expiry}$ should be $T_{fetch} + 1$ hour;
  else, $T_{expiry}$ should be $T_{fetch} + 24$ hours;
$\}$ Using the abovementioned composite function, the following expiry timestamps are calculated:
Time series datum 1 10 pm
Time series datum 2 10 pm
Time series datum 3 10 pm
Time series datum 4 10 pm
Time series datum 5 10 pm
Time series datum 6 9:15 pm
Time series datum 7 9:15 pm
Time series datum 8 9:15 pm
Time series datum 9 9:15 pm
Time series datum 10 9:15 pm While the expiry timestamp is calculated for each time series datum in the time series data, there are only two distinct expiry timestamps: 10 pm and 9:15 pm. These two timestamps are final result of step 330.

At step 340, the historian server 130 groups the plurality of time series datum into one or more time data chunks based on the one or more expiry timestamps. In an embodiment, all the time series datum which have the same expiry timestamp value are grouped together to form one time data chunk. Each time data chunk from the one or more time data chunks comprises a distinct set of time series datum from the time series data, i.e. no two time data chunks can have a common time series datum.

Continuing the abovementioned example, the user terminal groups the ten time series datum into two time data chunks. The first time data chunk includes the time series datum that have the expiry timestamp 10 pm (Time data chunk 1={45, 65, 78, 90, 112}). The second time data chunk includes the time series datum that have the expiry timestamp 9:15 pm (Time data chunk 2={120, 123, 145, 170, 210}).

At step 350, the historian server 130 stores a copy of the time series data and the one or more expiry timestamps in the at least one cache. Expiry timestamps serve as indicators about the validity of the time series data stored in the at least one cache. Any request for the time series data will check the expiry timestamps to verify if the time series data stored in the at least one cache is valid or not. At step 360, the flowchart 300 terminates.

Figure 4:
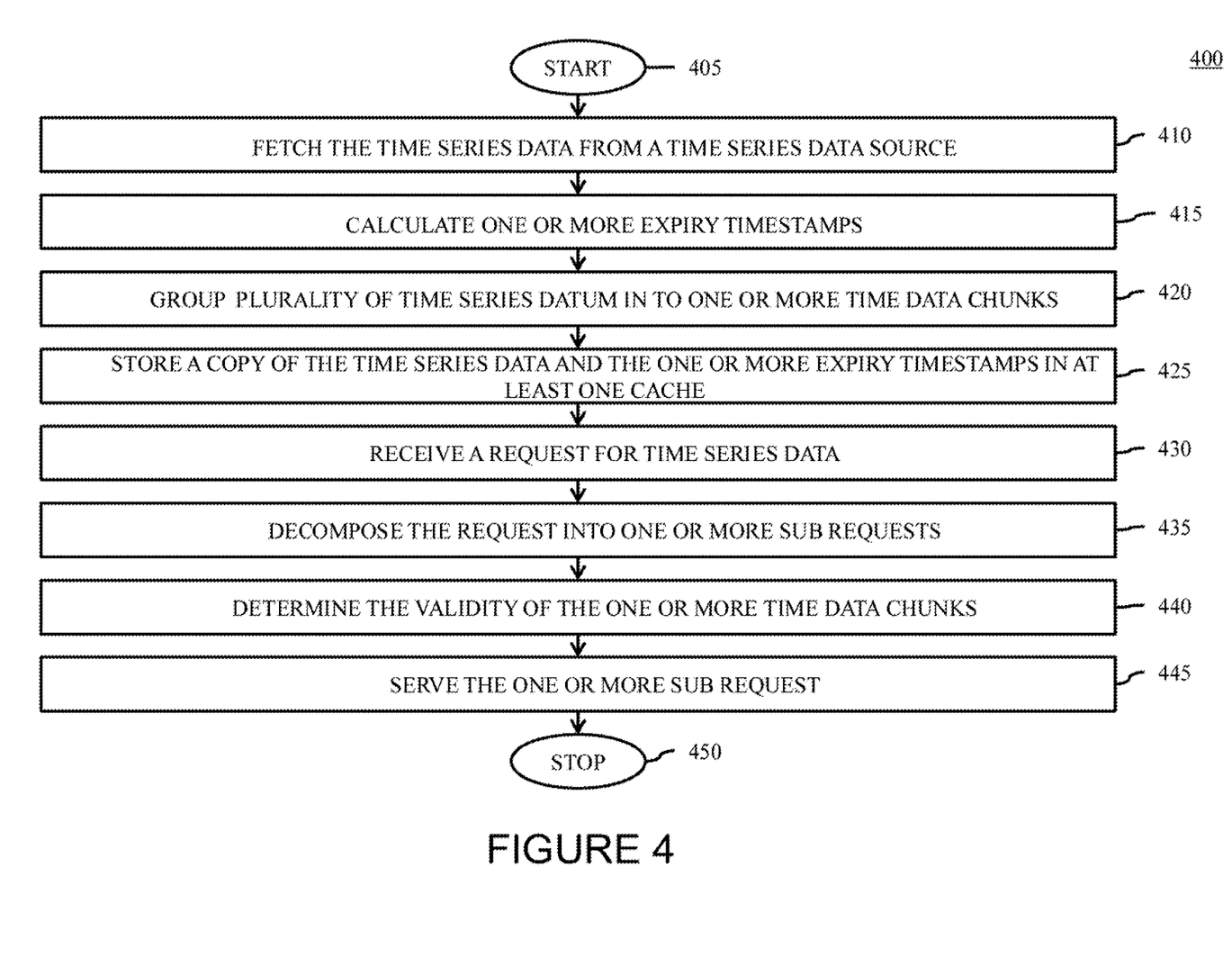
FIG. 4 illustrates a flowchart for caching time series data and serving a request for time series data, in accordance with various embodiments of the present invention.

FIG. 4 illustrates a flowchart 400 for caching time series data and serving a request for time series data, in accordance with various embodiments of the present invention. The flowchart 400 is be implemented the historian server 130.

At step 405, the flowchart 400 initiates. Steps 410-425 of the flowchart 400 are similar to the steps 310-350 of the flowchart 300. At step 410, as explained above, the historian server 130 fetches the time series data from the historian server 130.

At step 415, as explained above, the historian server 130 calculates one or more expiry timestamps. Each expiry timestamp from the one or more expiry timestamps is calculated using a composite function of a recording time of a time series datum and the fetch timestamp. Each expiry timestamp calculated using the composite function is inversely proportional to the recording time associated with the time series datum and directly proportional to the fetch timestamp of the time series data. In an embodiment, the composite function is a monotonically non increasing function between recording timestamp and expiry timestamp, i.e., as the value of recording time increases the value of the expiry timestamp decreases.

At step 420, the historian server 130 groups the plurality of time series datum into one or more time data chunks based on the one or more expiry timestamps. In an embodiment, all the time series datum which have the same expiry timestamp value are grouped together to form one time data chunk. Each time data chunk from the one or more time data chunks comprises a distinct set of time series datum from the time series data, i.e. no two time data chunks can have a common time series datum.

At step 425, the historian server 130 stores a copy of the time series data and the one or more expiry timestamps in the at least one cache. At step 430, the historian server 130 receives a request for the time series data. In an embodiment, the user 120 makes the request using the browser on the user terminal 110. Continuing the abovementioned example, the user terminal receives a request for the time series data recorded between 2 pm and 6:30 pm at 9:45 pm.

At step 435, the historian server 130 decomposes the request into one or more sub requests based on the one or more time data chunks of the time series data. Continuing the abovementioned example, the request is broken in two sub requests, the first sub request for the first time data chunk and the second sub request for the second time data chunk.

At step 440, the historian server 130 determines the validity of the one or more time data chunks of the time series data based on the one or more expiry timestamps. Continuing the abovementioned example, the historian server 130 determines the validity of the first time data chunk and the second time data chunk. The first time data chunk has the expiry timestamp 10 pm, and therefore is valid at 9:45 pm. The second time data chunk has the expiry timestamp 9:15 pm, and therefore is invalid at 9:45 pm.

At step 445, the historian server 130 serves the one or more sub requests from one of a group consisting of the time series data source and the at least one cache, based on the validity of the one or more time data chunks of the time series data. Continuing the abovementioned example, the historian server 130 serves the first sub request by retrieving the first time data chunk from the at least one cache as the first time data chunk is still valid. Since the second time data chunk is invalid, the historian server 130 serves the second sub request by fetching the second time data chunk from the application servers 140. At step 350, the flowchart 300 terminates.

By decomposing the request into sub request and chunking the time series data into time data chunks, the present invention is able to create an optimal caching policy for the time series data. Since older time series data values are less likely to change, the composite function is able to calculate expiry timestamps which are reflective of this property. Moreover, by dividing the request in sub requests, the present invention is able to ensure that only the time data chunks which are invalid are served from the time series sources and not the entire time series data. By doing so, the present invention is able to reduce network load and improve speed of access.

Figure 5:
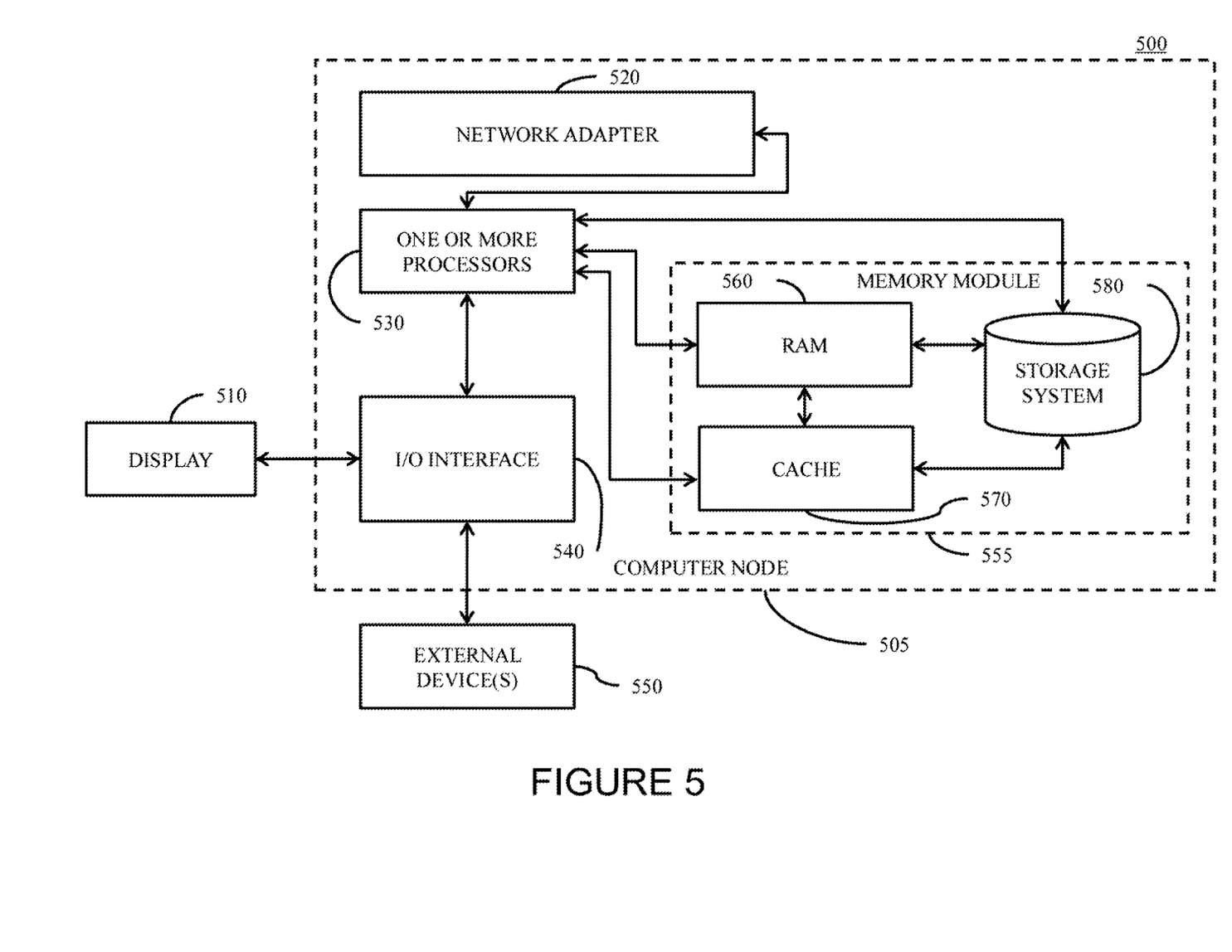
FIG. 5 illustrates a computer node for caching time series data, in accordance with various embodiments of the present invention.

FIG. 5 illustrates a computer node 500 for caching time series data, in accordance with various embodiments of the present invention. The components of the computer node 500 include, but are not limited to, one or more processors 530, a memory module 555, a network adapter 520, an input-output (I/O) interface 540 and one or more buses that couples various system components to one or more processors 530.

The one or more buses represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer node 500 typically includes a variety of computer system readable media. Such media may be any available media that is accessible by the computer node 500, and includes both volatile and non-volatile media, removable and non-removable media. In an embodiment, the memory module 555 includes computer system readable media in the form of volatile memory, such as random access memory (RAM) 560 and at least one cache 570. The computer node 500 may further include other removable/non-removable, non-volatile computer system storage media. In an embodiment, the memory module 555 includes a storage system 580.

The computer node 500 communicates with one or more external devices 550 and a display 510, via input-output (I/O) interfaces 540. In addition, the computer node 500 can communicate with one or more networks such as a local area network (LAN), a general wide area network (WAN), and/or a public network (for example, the Internet) via the network adapter 520.

It can be understood by one skilled in the art that although not shown, other hardware and/or software components can be used in conjunction with the computer node 500. Examples, include, but are not limited to: microcode, device drivers, redundant processing units, external disk drive arrays, RAID systems, tape drives, and data archival storage systems, etc. In an embodiment, the configuration and capabilities of the historian 130 and the user terminal 110 is same as configuration and capabilities of the computer node 500.

As will be appreciated by one skilled in the art, aspects can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language and conventional procedural programming languages.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer implemented method for caching time series data, the method comprising:
    fetching time series data from a time series data source, wherein the time series data comprises a plurality of time series datum and a fetch timestamp;
    calculating one or more expiry timestamps, wherein each expiry timestamp from the one or more expiry timestamps is calculated using a composite function of the fetch timestamp of the time series data and a recording time associated with a time series datum, such that the expiry timestamp is inversely proportional to the recording time associated with the time series datum so that newer time series data expires on or before older time series data, and the expiry time stamp is directly proportional to the fetch timestamp of the time series data;
    grouping the plurality of time series datum in to one or more time data chunks based on the one or more expiry timestamps, wherein each time data chunk from the one or more time data chunks comprises a distinct set of time series datum from the time series data;
    determining the validity of the one or more time data chunks of the time series data based on the one or more expiry timestamps;
    storing a copy of the time series data and the one or more expiry timestamps in the at least one cache,
    serving the requests from one of a group comprising the time series data source and the at least one cache, based on the validity of the one or more time data chunks of the time series data; and
    utilizing the one or more expiry timestamps to respond to requests for the time series data.

2. The computer system as claimed in claim 1, wherein the non-transitory computer readable storage medium includes further instructions that, when executed by the one or more processors, cause the one or more processors to perform a set of steps comprising:
    decomposing the request into one or more sub requests based on the one or more time data chunks of the time series data; and
    serving the one or more sub requests from one of the group consisting of the time series data source and the at least one cache, based on the validity of the one or more time data chunks of the time series data.

3. The computer system as claimed in claim 2, wherein the instructions that when executed by the one or more processors are configured to determine the validity of the one or more time data chunks by comparing an associated expiry timestamp with a request timestamp associated with the request.

4. The computer system as claimed in claim 1, wherein the composite function is monotonically decreasing function with a predetermined upper limit.

5. The computer system as claimed in claim 1, wherein the at least one cache is a browser cache.

6. A computer implemented method for caching time series data, the computer implemented method comprising:
    receiving a request for the time series data, wherein the time series data comprises a plurality of time series datum and a fetch timestamp;
    calculating, by the one or more processors, one or more expiry timestamps wherein each expiry timestamp from the one or more expiry timestamps is calculated using a composite function of the fetch timestamp of the time series data and a recording time associated with a time series datum, such that the expiry timestamp is inversely proportional to the recording time associated with the time series datum so that newer time series data expires on or before older time series data, and the expiry time stamp is directly proportional to the fetch timestamp of the time series data;
    wherein:
        the plurality of time series datum is grouped in to one or more time data chunks based on the one or more expiry timestamps, wherein each time data chunk from the one or more time data chunks comprises a distinct set of time series datum from the time series data;
        the validity of the one or more time data chunks of the time series data is determined based on the one or more expiry timestamps;
        a copy of the time series data and the one or more expiry timestamps is stored in at least one cache;
        the requests from one of a group comprising the time series data source and the at least one cache is served based on the validity of the one or more time data chunks of the time series data; and
    utilizing the one or more expiry timestamps to respond to requests for the time series data.

7. The computer implemented method as claimed in claim 6, further comprising:
    decomposing, by the one or more processors, the request into one or more sub requests based on the one or more time data chunks of the time series data;
    serving, by the one or more processors, the one or more sub requests from one of the group consisting of the time series data source and the at least one cache, based on the validity of the one or more time data chunks of the time series data.

8. The computer implemented method as claimed in claim 7, wherein determining the validity of the one or more time data chunks comprises comparing an associated expiry timestamp with a request timestamp associated with the request.

9. The computer implemented method as claimed in claim 6, wherein the composite function is a monotonically decreasing function with a predetermined upper limit.

10. A computer implemented method for serving time series data, the computer implemented method comprising:
    receiving, by one or more processors, a request for the time series data;
    calculating, by the one or more processors, one or more expiry timestamps wherein each expiry timestamp from the one or more expiry timestamps is calculated using a composite function of current time and a recording time associated with a time series datum, such that the expiry timestamp is inversely proportional to the recording time associated with the time series datum so that newer time series data expires on or before older time series data, and the expiry time stamp is directly proportional to the current time
    decomposing, by the one or more processors, the request into one or more sub requests based on the one or more expiry timestamps; and
    determining, by the one or more processors, the validity of the one or more time data chunks of the time series data based on the one or more expiry timestamps; and
    serving, by the one or more processors, the one or more sub requests from one of a group consisting of the time series data source and the at least one cache, based on the one or more expiry timestamps.

11. The computer implemented method in claim 10, wherein the instructions that when executed by the one or more processors are configured to determine the validity of the one or more time data chunks by comparing an associated expiry timestamp with a request timestamp associated with the request.

12. The computer implemented method in claim 10, wherein the composite function is a monotonically decreasing function with a predetermined upper limit.

13. The computer system as claimed in claim 1, wherein the non-transitory computer readable storage medium includes further instructions wherein, when executed by the one or more processors cause the one or more processors to perform calculating one or more expiry timestamps by:

Texpiry=Fcomposite(Trecord, Tfetch)
Fcomposite (Trecord, Tfetch)={
if (Tfetch−Trecord)<t1, then Texpiry should be Tfetch+t2;
else if t1<=(Tfetch−Trecord)<t3, then Texpiry should be Tfetch+t4;
else if t3<=(Tfetch−Trecord)<t5, then Texpiry should be Tfetch+t6; and
else, Texpiry should be Tfetch+t5;
wherein "Texpiry" represents each of the expiry timestamps, "Trecord" represents the recording time associated with the time series datum, "Tfetch" represents the fetch timestamp, and "Fcomposite" represents the composite function, and t1, t2, t3, t4, and t5 represent predetermined times, and t1<t3<t5 and t2<t4<t6.

14. The computer implemented method as claimed in claim 6, wherein the non-transitory computer readable storage medium includes further instructions wherein, when executed by the one or more processors cause the one or more processors to perform calculating one or more expiry timestamps by:

Texpiry=Fcomposite(Trecord, Tfetch)
Fcomposite (Trecord, Tfetch)={
if (Tfetch−Trecord)<t1, then Texpiry should be Tfetch+t2;
else if t1<=(Tfetch−Trecord)<t3, then Texpiry should be Tfetch+t4;
else if t3<=(Tfetch−Trecord)<t5, then Texpiry should be Tfetch+t6; and
else, Texpiry should be Tfetch+t5;
wherein "Texpiry" represents each of the expiry timestamps, "Trecord" represents the recording time associated with the time series datum, "Tfetch" represents the fetch timestamp, and "Fcomposite" represents the composite function, and t1, t2, t3, t4, and t5 represent predetermined times, and t1<t3<t5 and t2<t4<t6.

15. A non-transitory, computer program product comprising instructions stored therein that, when executed by the one or more processors, cause the one or more processors to perform a set of steps comprising:
receiving a request for the time series data;
fetching the time series data from a time series data source, wherein the time series data comprises a plurality of time series datum and a fetch timestamp;
calculating one or more expiry timestamps, wherein each expiry timestamp from the one or more expiry timestamps is calculated using a composite function of the fetch timestamp of the time series data and a recording time associated with a time series datum, such that the expiry timestamp is inversely proportional to the recording time associated with the time series datum so that newer time series data expires on or before older time series data, and the expiry time stamp is directly proportional to the fetch timestamp of the time series data;
grouping the plurality of time series datum in to one or more time data chunks based on the one or more expiry timestamps, wherein each time data chunk from the one or more time data chunks comprises a distinct set of time series datum from the time series data;
determining the validity of the one or more time data chunks of the time series data based on the one or more expiry timestamps;
storing a copy of the time series data and the one or more expiry timestamps in the at least one cache;
serving the requests from one of a group consisting of the time series data source and the at least one cache, based on the validity of the one or more time data chunks of the time series data; and
utilizing the one or more expiry timestamps to respond to requests for the time series data.

16. The non-transitory, computer program product as claimed in claim 15, wherein the instructions when executed by the one or more processors, cause the one or more processors to perform a set of steps comprising:
decomposing the request into one or more sub requests based on the one or more time data chunks of the time series data; and
serving the one or more sub requests from one of the group consisting of the time series data source and the at least one cache, based on the validity of the one or more time data chunks of the time series data.

17. The non-transitory, computer program product as claimed in claim 16, wherein the instructions that when executed by the one or more processors are configured to determine the validity of the one or more time data chunks by comparing an associated expiry timestamp with a request timestamp associated with the request.

18. The non-transitory, computer program product as claimed in claim 15, wherein the composite function is a monotonically decreasing function with a predetermined upper limit.

19. The non-transitory, computer program product as claimed in claim 15, wherein the at least one cache is a browser cache.

20. The non-transitory, computer program product as claimed in claim 15, wherein the instructions when executed by the one or more processors cause the one or more processors to perform calculating one or more expiry timestamps by:

Texpiry=Fcomposite(Trecord, Tfetch)
Fcomposite (Trecord, Tfetch)={
if (Tfetch−Trecord)<t1, then Texpiry should be Tfetch+t2;
else if t1<=(Tfetch−Trecord)<t3, then Texpiry should be Tfetch+t4;
else if t3<=(Tfetch−Trecord)<t5, then Texpiry should be Tfetch+t6; and
else, Texpiry should be Tfetch+t5;
wherein "Texpiry" represents each of the expiry timestamps, "Trecord" represents the recording time associated with the time series datum, "Tfetch" represents the fetch timestamp, and "Fcomposite" represents the composite function, and t1, t2, t3, t4, and t5 represent predetermined times, and t1<t3<t5 and t2<t4<t6.

* * * * *